(12) United States Patent
Wang

(10) Patent No.: US 12,318,880 B2
(45) Date of Patent: Jun. 3, 2025

(54) PIPE FEEDING MACHINE

(71) Applicant: CHIAO SHENG MACHINERY CO., LTD., Tainan (TW)

(72) Inventor: Sheng Tsung Wang, Tainan (TW)

(73) Assignee: CHIAO SHENG MACHINERY CO., LTD., Tainan (TW)

(*) Notice: Subject to any disclaimer, the term of this patent is extended or adjusted under 35 U.S.C. 154(b) by 372 days.

(21) Appl. No.: 17/903,933

(22) Filed: Sep. 6, 2022

(65) Prior Publication Data

US 2024/0075570 A1    Mar. 7, 2024

(51) Int. Cl.
*B23Q 5/34* (2006.01)

(52) U.S. Cl.
CPC .................... *B23Q 5/34* (2013.01)

(58) Field of Classification Search
CPC .......... B23Q 5/34; B65G 47/1471; B65G 2201/0276; B65G 1/0442; B65G 2201/0217; B65G 47/8815; B65G 57/186; B21D 43/006; B21D 43/285; B21D 3/045; B21D 39/04; F27D 2003/0093; F27D 2003/0098; E21B 19/15; E21B 19/14
USPC ......... 414/22.62, 746.4, 746.2, 745.9, 746.1, 414/198, 414
See application file for complete search history.

(56) References Cited

U.S. PATENT DOCUMENTS

| | | | | |
|---|---|---|---|---|
| 3,072,267 A | * | 1/1963 | Gasparetti | B65G 47/82 |
| | | | | 414/746.1 |
| 3,072,980 A | * | 1/1963 | Ewing | B22D 13/02 |
| | | | | 414/745.9 |
| 3,844,420 A | * | 10/1974 | Walling | E21B 19/15 |
| | | | | 414/22.62 |
| 4,208,164 A | * | 6/1980 | White | B21D 43/006 |
| | | | | 198/690.1 |
| 4,298,141 A | * | 11/1981 | Ramunas | B65G 47/8823 |
| | | | | 414/746.4 |
| 4,377,368 A | * | 3/1983 | Koch | B65G 47/8815 |
| | | | | 414/746.4 |
| 4,852,716 A | * | 8/1989 | Roche | B65G 47/1478 |
| | | | | 414/745.9 |
| 5,769,597 A | * | 6/1998 | Tsune | B65G 47/8838 |
| | | | | 414/746.1 |
| 7,150,350 B2 | * | 12/2006 | Hsu | F28D 15/0283 |
| | | | | 198/531 |
| 7,537,424 B2 | * | 5/2009 | Innes | E21B 19/155 |
| | | | | 414/22.62 |

(Continued)

*Primary Examiner* — Gregory W Adams
(74) *Attorney, Agent, or Firm* — Ying-Ting Chen; Law Office of Michael Chen

(57) ABSTRACT

The present invention relates to a pipe feeding machine in which the frame is equipped with plural conveying devices, plural lifting plates, plural pipe diameter limiting devices, a group loading device and an independent loading device; wherein the conveying device comprises a conveying belt, and the group and independent loading devices comprise a pusher plate and a positioning plate; when the lifting plate with the pipes is raised to the plane of the conveying belt and the pipes are conveyed between the pusher plate and positioning plate, which is able to further transport a single pipe to the center of the chuck assembly for processing, which replaces the conventional feeding belt to avoid the collision during the lifting and conveying of the pipes, and to improve the efficiency and yield of pipe production.

8 Claims, 18 Drawing Sheets

(56) References Cited

U.S. PATENT DOCUMENTS

| | | | |
|---|---|---|---|
| 8,113,762 B2* | 2/2012 | Belik | E21B 19/15 |
| | | | 414/746.4 |
| 8,257,010 B2* | 9/2012 | Hirosawa | B23B 13/10 |
| | | | 414/746.1 |
| 2017/0144846 A1* | 5/2017 | Vielhaber | B65G 57/186 |
| 2020/0247615 A1* | 8/2020 | Del Fabro | B65G 65/00 |

* cited by examiner

PIPE FEEDING MACHINE

FIELD OF THE INVENTION

This invention relates to a pipe feeding machine, more particularly a pipe feeding machine which is equipped at the side of the pipe processing mechanism and is used to move and convey the pipes to the processing position of the pipe processing mechanism, so as to complete the pipe feeding process automatically.

BACKGROUND OF THE INVENTION

The pipe feeding machine is usually equipped and combined at the side of the pipe processing mechanism, so that the pipe can be automatically conveyed and positioned through the feeding machine before entering the processing mechanism for bending, cutting, engraving, etc., and even completes the measurement of the length of the pipe in advance to speed up the processing of the operation.

For the related prior art, please refer to Taiwan Patent No. M300146, which discloses an "A Pipe Feeding Machine with an Automatic Sorting Control and Adjustment Structure", and is shown in FIG. 1. Please refer to the drawing, the pipe feeding machine 1 mainly has a first material rack 10 with a fixed end for fixing a material limiting rod 11 and a feeding belt 12, and the other end of the feeding belt 12 is fixed to a winding wheel 131 of a second frame 13, and the front end of the limiting rod 11 is pivoted to an induction actuator 111 and front-end limiting rod 112, using a sensor 113 of the induction actuator 111 to sense whether the oscillation exceeds the limit and transmits a sensing signal to a controller 14, hereby making the cross-stacked pipes T when they are pushed upwards as the take-up pulley 131 continues to wind up the feeding belt 12, the pipes T will contact the induction actuator 111 and send a sensing signal to the controller 14 to request to stop winding the feeding belt 12 when it exceeds its limited oscillation and unwind the feeding belt 12, so that the pipes T will return to the first material rack 10 for re-feeding, so it doesn't need manpower to do the discharge which can save labor-hours.

However, although the above-mentioned prior art can eliminate the manual material discharging procedure, the operation still has the following drawbacks:

1. the prior art uses the feeding belt to convey the pipes by means of the lifting method, as a result, the process of feeding or withdrawing the pipes will cause the overlapping to collide with each other and cause noise due to the collision;
2. the prior art uses the feeding belt to convey the pipes by means of the lifting method, which is only applicable to the round shape pipes, and cannot be used for other shapes of pipes; and
3. the prior art uses the feeding belt to convey the pipes by means of the lifting method, although it can use the feeding belt to pre-set most of the pipe, but the pipes still have to be conveyed by lifting high, which will surely increase the height of the material rack and make the pipe feeding machine easy to happen the problem of space interference.

SUMMARY OF THE INVENTION

In view of the fact that the conventional pipe feeding machine uses the feeding belt to convey the pipes by way of lifting method and easy to causes the overlapping and collision of the pipes, so it is obvious that there is a shortcoming to be improved.

Therefore, the purpose of the present invention is to cooperate with the conveying device and feeding device through plural lifting plates, so that the pipe can be automatically conveyed, lifted, and positioned to the corresponding feeding position, in order to achieve the purpose of stable feeding and increase the efficiency of pipe processing.

To achieve the aforementioned purposes, the present invention provides a pipe feeding machine for installation at the side of a pipe processing mechanism that has a feeding mechanism and at least one chuck assembly, and comprising: a frame; plural conveying devices assembled on the frame, and a conveying belt for conveying pipe which is disposed on a fixed seat, and plural conveying devices are driven by a first motor to drive a first linkage shaft to operate the conveying belt, the front of the conveyor belt is formed as a slope; plural lifting plates, which are slidable to assemble with the fixed seat slantwise and are used to accommodate the pipes, also can be driven by a second motor to drive a second linkage shaft to drive the lifting plate to slide up and down on the fixed seat; plural pipe diameter limiting devices which are assembled on the frame, the pipe diameter limiting device contains a sensor, a first servo motor, and a third linkage shaft, the first servo motor can drive the third linkage shaft moving up or down to an appropriate height according to the height of the pipe sensed by the sensor; a group loading device, the group loading device contains at least two loading devices, and each loading device contains a pusher plate and a positioning plate, the pusher plate can be slidably and slantwise assembled with the fixed seat slantwise, and drive a fourth linkage shaft through a second servo motor to drive the pusher plate sliding synchronously on the fixed seat, and the positioning plate is slidably fixed to the top of the lifting plate, so the positioning plate is capable of sliding synchronously on the lifting plate by a third servo motor driving a fifth linkage shaft; and an independent loading device comprising a lifting plate and a positioning plate, the pusher plate can be slidably and slantwise assembled with the fixed seat, and can be driven by a fourth servo motor to drive the pusher plate to slide on the fixed seat, and the positioning plate is slidably fixed to the top of the lifting plate and can be driven by a fifth servo motor to drive the positioning plate to slide on the pusher plate.

Based on the above, when the lifting plate with the pipe is raised up to the plane of the conveying belt, and when the pipe is transported to the position between the lifting plate and positioning plate, so a single pipe can be moved to the corresponding central position of the chuck assembly by shifting the lifting plate and the positioning plate synchronously, to provide the chuck assembly to clamp the pipe for processing. The lifting plate of the present invention replaces the conventional feeding belt to avoid collision between pipes in the process of lifting and conveying the pipe, thus improving the processing efficiency and yield of the pipe.

DESCRIPTION OF THE PREFERRED EMBODIMENTS

Figure 1:
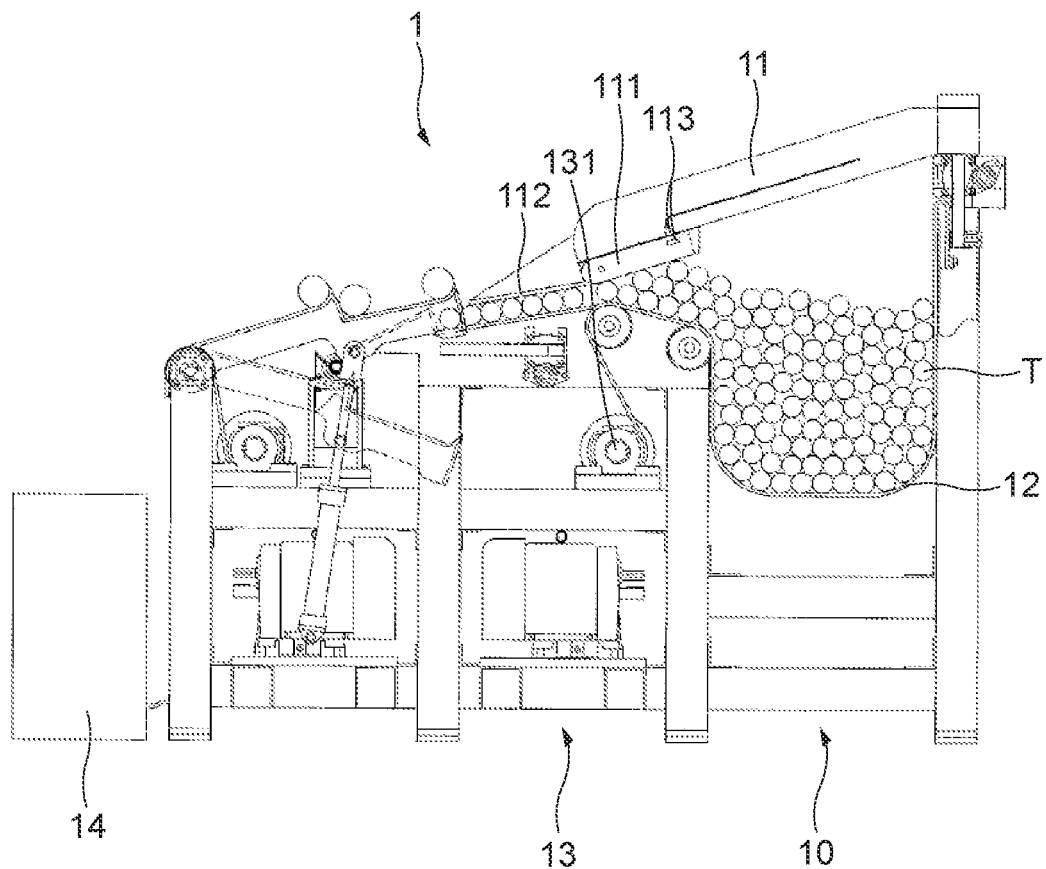
FIG. 1 is a schematic diagram of a conventional pipe feeding machine.
Figure 2:
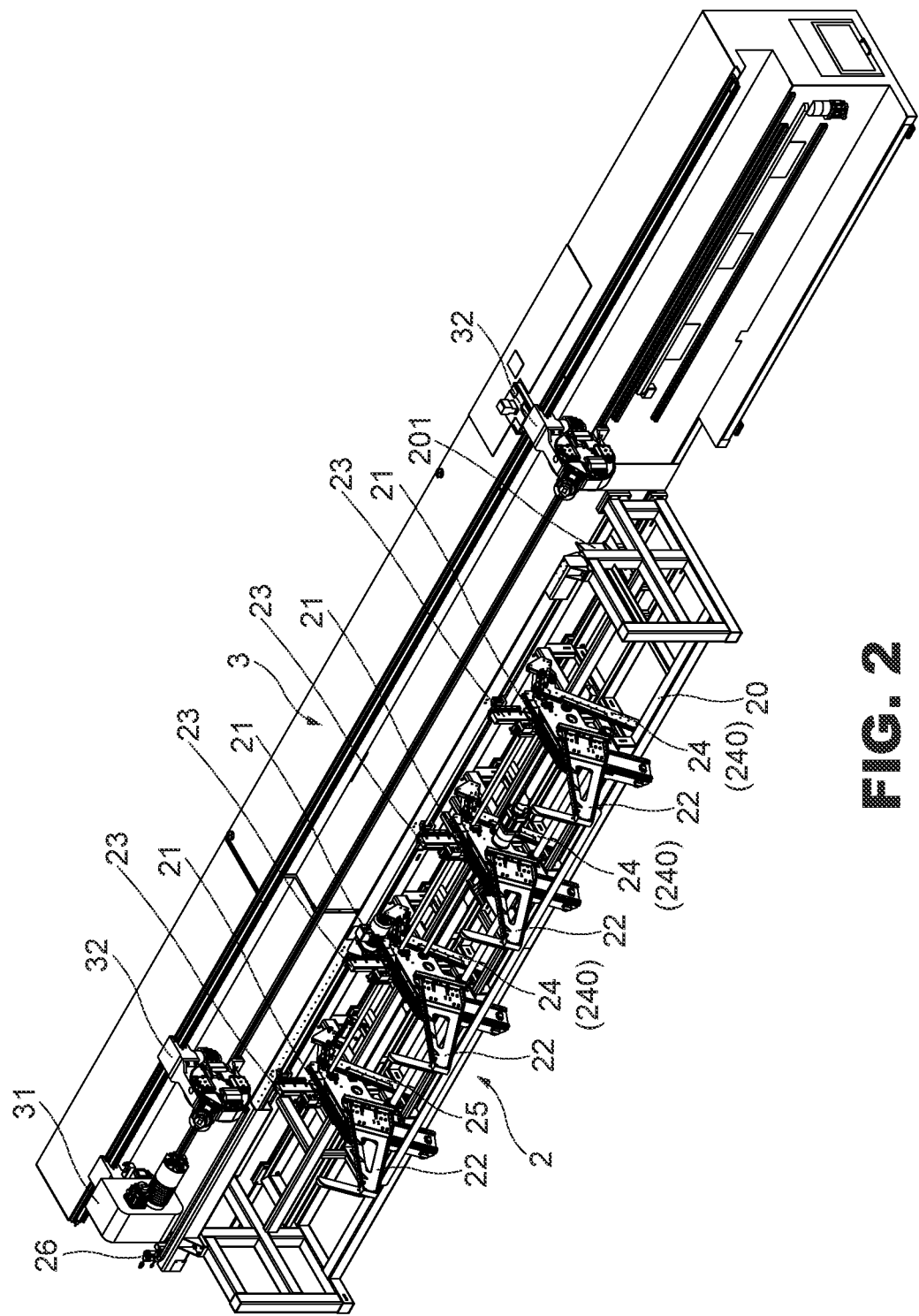
FIG. 2 is a perspective view of the present invention.
Figure 3:
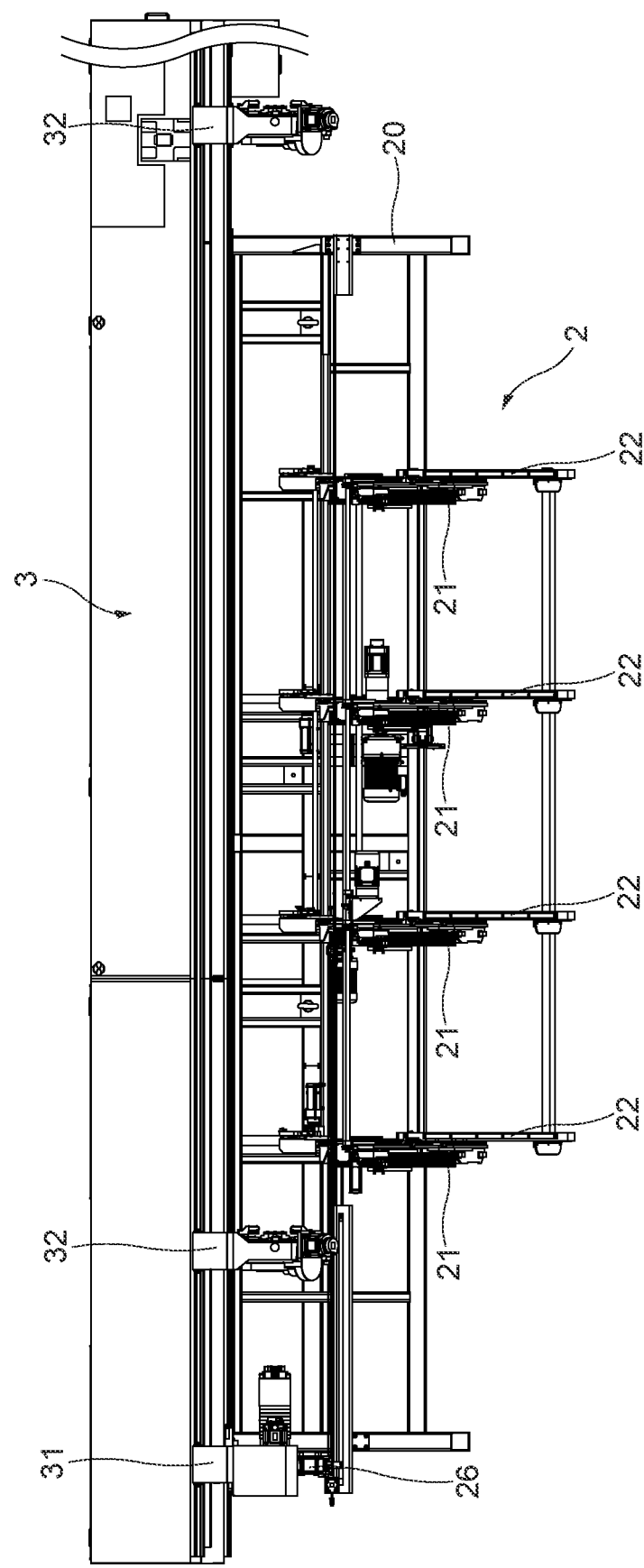
FIG. 3 a plan view of the present invention.
Figure 4:
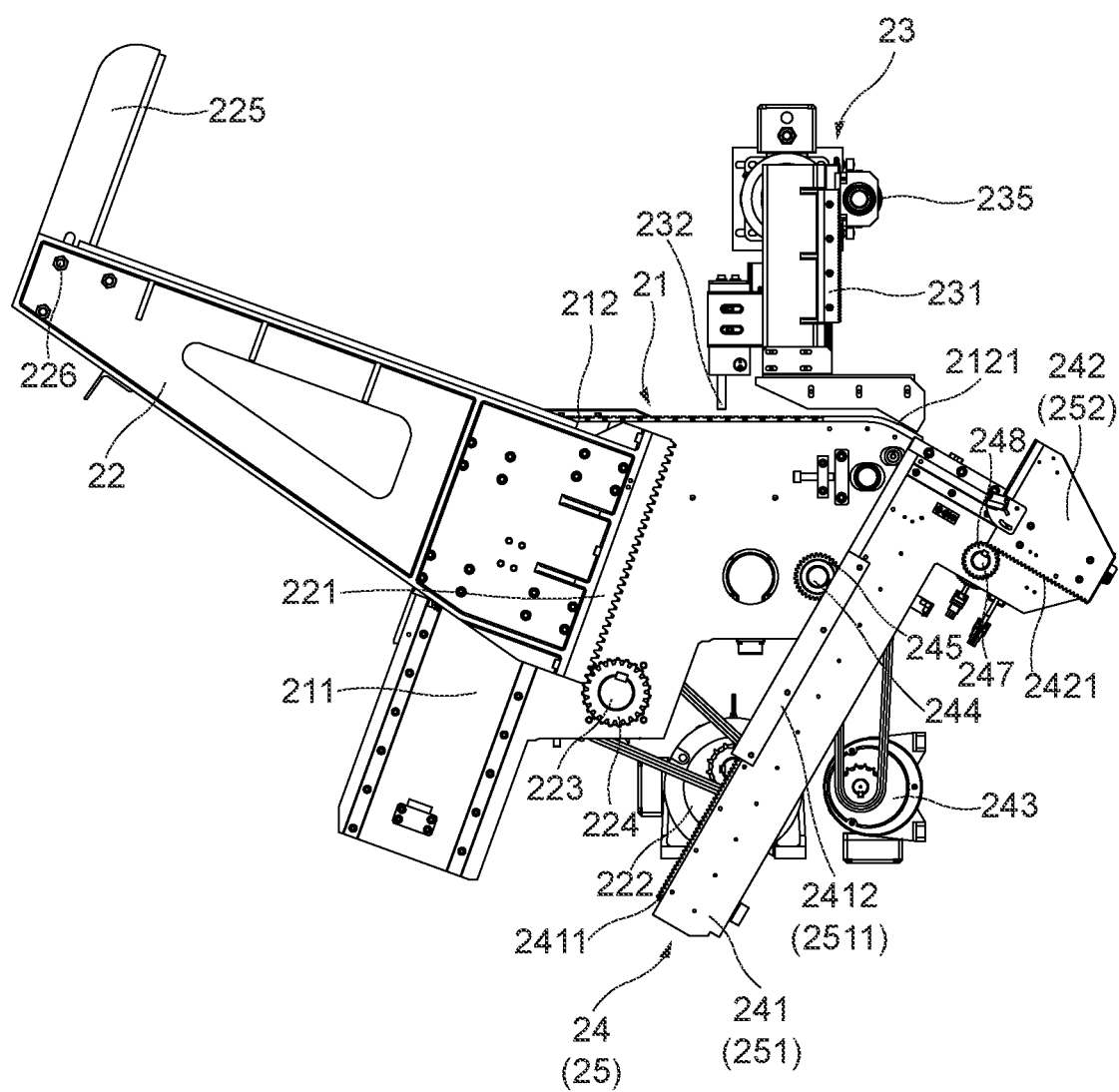
FIG. 4 is a side view of the pipe feeding structure of the present invention.
Figure 5:
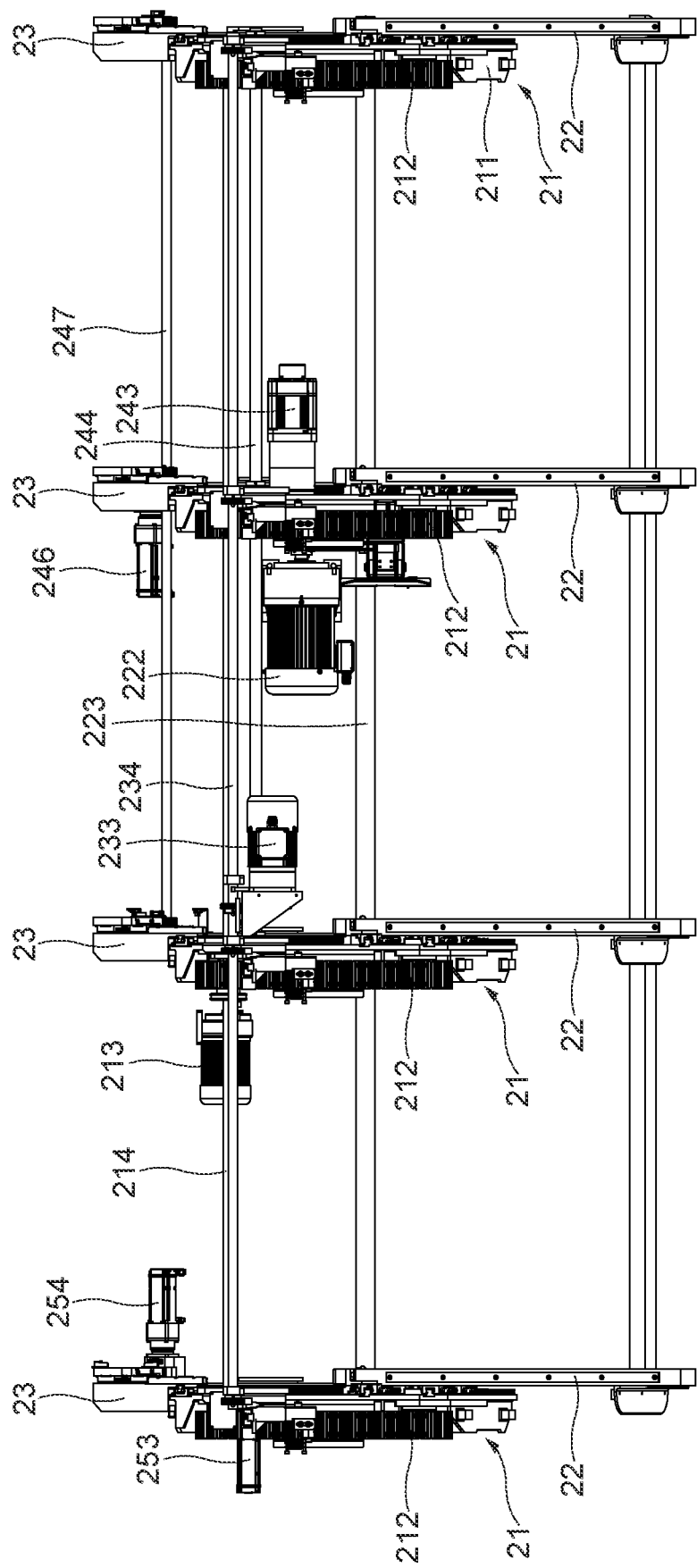
FIG. 5 is a top view of the pipe feeding structure of the present invention.

In order to achieve a more complete disclosure of the technical contents of the present invention, the following is described in detail, and please also refer to the disclosed drawings and their numbers:

Firstly, with reference to FIGS. 2 to 4, the pipe feeding machine 2 of the present invention is equipped at the side of a pipe processing mechanism 3 having a feeding mechanism 31 and at least one chuck assembly 32. The pipe feeding machine 2 comprises a frame 20, plural conveying devices 21, plural lifting plates 22, plural pipe diameter limiting devices 23, a group loading device 24, an independent loading device 25, and a pipe measuring device 26; wherein the conveying device 21 is assembled on the frame 20, and a fixed seat 211 is provided with a conveying belt 212 for conveying the pipes, and the plural conveying devices 21 are driven by a first motor 213 to drive a first linkage shaft 214 and the conveying belt 212 for operation (refer to FIG. 5). The front end of the conveying belt 212A is formed as a slope 2121.

Plural lifting plates 22 are slidably set on the fixed seat 211 slantwise, and are used for accommodating pipes. A rack 221 is arranged on one end of the lifting plate 22 close to the fixed seat 211, and the rack 221 is engaged with a gear 224 of a second linkage shaft 223, can be driven by a second motor 222 to drive the second linkage shaft 223 to operate. A baffle plate 225 is pivotally disposed on the end edge of the lifting plate 22 at the opposite side of the fixed seat 211, and the baffle plate 225 can be rotated 90 degrees on the axis of the pivot point 226 to extend the length of the lifting plate 22.

Plural pipe diameter limiting devices 23 are assembled on the frame 20 containing a sensor 232 with it. A rack 231 is disposed on the pipe diameter limiting device 23, which engages with a gear 235 of a third linkage shaft 234 and can be driven by a first servo motor 233. The first servo motor 233 can drive the third linkage shaft 234 according to the height of the pipe sensed by the sensor 232. The third linkage shaft 234 can be driven by the first servo motor 233 to move up or down to an appropriate height according to the height of the pipe sensed by the sensor 232, and transmit a signal to the conveying device 21 to drive the conveying belt 212 backward when the sensor 232 senses collision with the pipe.

The group loading device 24 includes at least two loading devices 240, and the loading device 240 includes a pusher plate 241 and a positioning plate 242, wherein the pusher plate 241 is slidably set on the fixed seat 211 slantwise and has a rack 2411, which is engaged with a gear 245 of a fourth linkage shaft 244, and the fourth linkage shaft 244 is driven through the second servo motor 243 to drive the pusher plate 241 sliding synchronously on the fixed seat 211, meanwhile, a rubber strip 2412 which is made of an anti-collision material is provided at the end of the pusher plate 241 that contacts the pipes. The positioning plate 242 is slidably fixed to the top of the pusher plate 241 and is provided with a rack 2421 which is engaged with a gear 248 sleeved on a fifth linkage shaft 247, the fifth linkage shaft 247 can be driven through a third servo motor 246 to drive the positioning plate 242 sliding synchronously on the pusher plate 241. The independent loading device 25 consists of a pusher plate 251 and a positioning plate 252, wherein the pusher plate 251 is slidably set on the fixed seat 211 slantwise, and the pusher plate 251 of the independent feeding device 25 is driven through a fourth servo motor 253 to slide synchronously on the fixed seat 211, meanwhile, a rubber strip 2511 which is made of an anti-collision material, is provided at the end of the pusher plate 251 that contacts the pipes. The positioning plate 252 is slidably fixed to the top of the pusher plate 251 and the positioning plate 252 is driven through a fifth servo motor 254 to slide synchronously on the pusher plate 251. In addition, the pusher plate 241 (251) of the group loading device 24 and independent loading device 25 conveys the pipes to the center of the chuck assembly 32 by calculating the required moving distance according to the diameter of the pipe.

Figure 6:
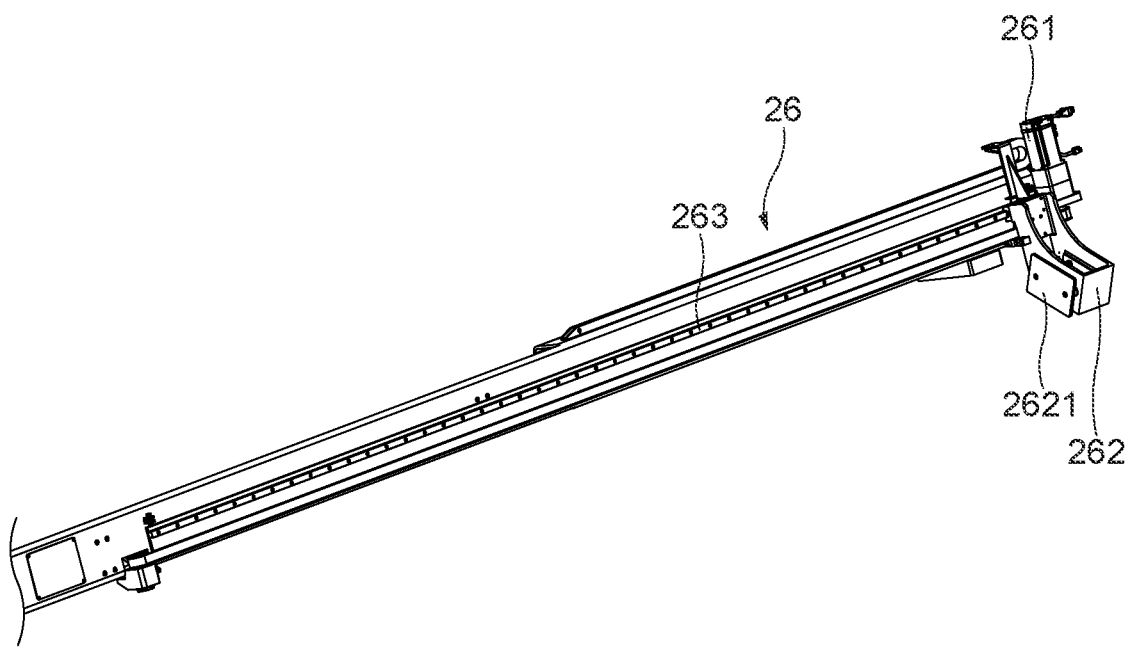
FIG. 6 is a schematic diagram of the pipe measuring device of the present invention.

A pipe measuring device 26 is assembled on the frame 20 and contains a sixth servo motor 261, a displacement mechanism 262 with a moving plate 2621, and a slide rail 263 (refer to FIG. 6), where the slide rail 263 is located on the frame 20, and a fixed plate 201 is disposed on the frame 20 opposite to the moving plate 2621 (refer to FIG. 2). The sixth servo motor 261 drives the displacement mechanism 262 to displace on the slide rail 263 until the two ends of the pipe are pressed against the fixed plate 201 and moving plate 2621 respectively.

Figure 7:
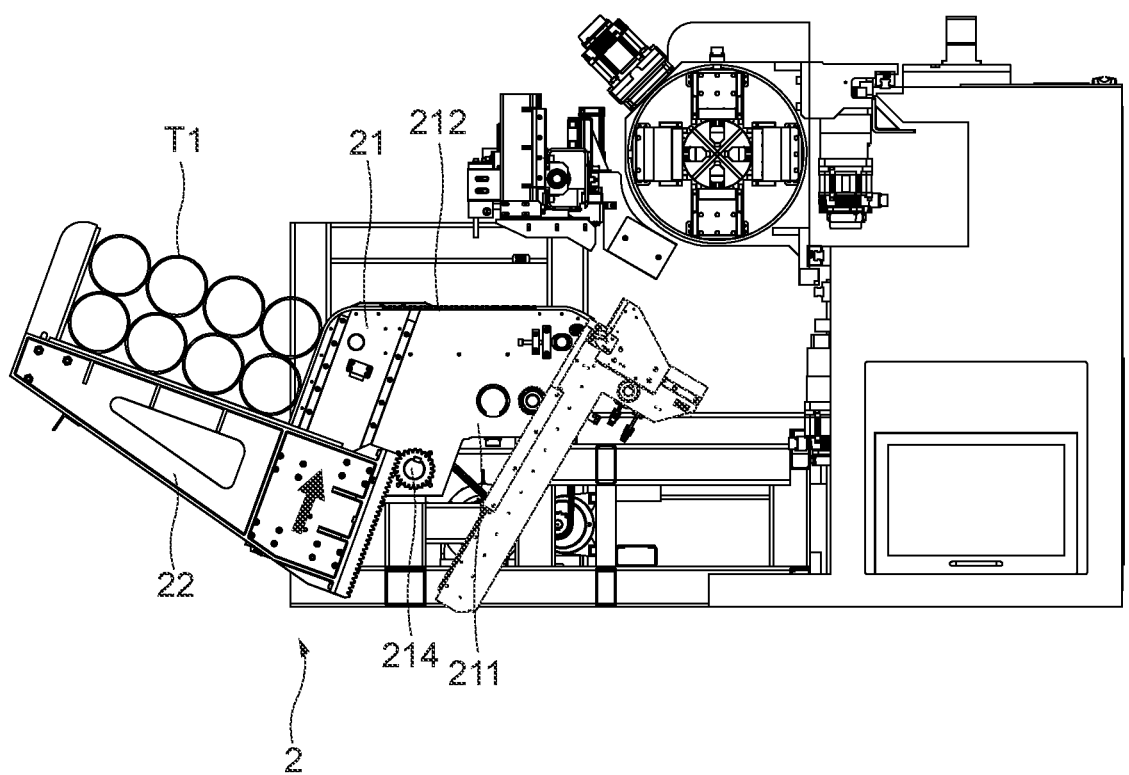
FIGS. 7-17 are schematic diagrams of the operation of the present invention.
Figure 8:
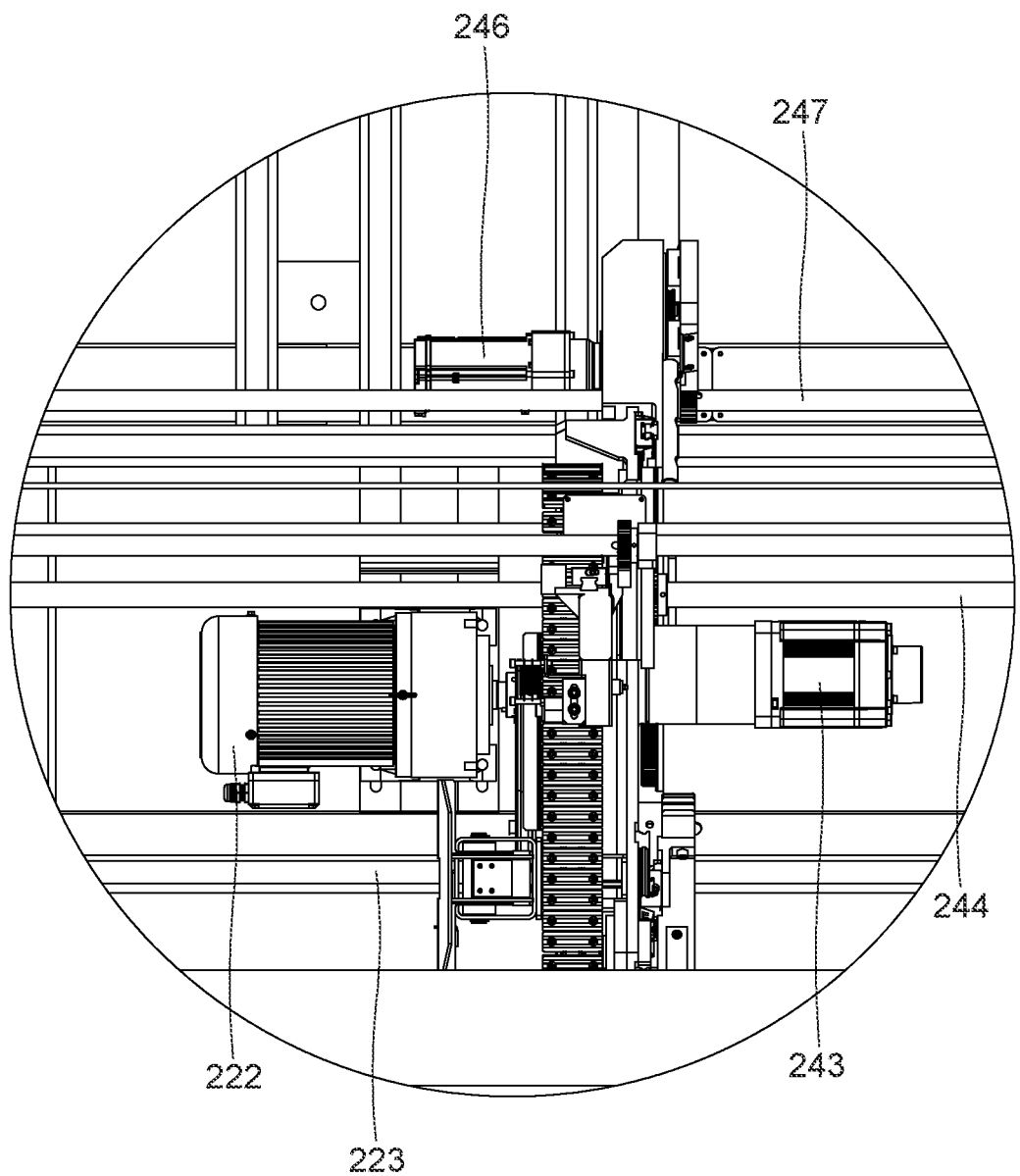

Secondly, as shown in FIG. 7, When the pipe feeding machine 2 of the present invention operates, it has to decide in advance based on the length of the pipe T1 whether it is operated by the group loading device 24 and independent loading device 25 together (applicable to long pipes), or by the group loading device 24 alone (applicable to short pipes). In this embodiment, the long pipe T1 is used as an example. When the pipes T1 are stacked on the lifting plate 22, the second motor 222 drives the second linkage shaft 223 to shift the lifting plate 22 upward on the fixed seat 211 (see FIG. 8) until the pipe T1 on the top enters the conveying belt 212 of the conveying device 21, then the conveying belt 212 conveys the pipe T1 moving forward continuously by means of the first motor 213 to drive the first linkage shaft 214 (refer to FIGS. 9 to 10), until the pipe T1 slides down through the slope 2121 to the position between the pusher plate 241 (251) and the positioning plate 242 (252). Since the pipe diameter limiting device 23 is adjusted in advance to an appropriate height according to the diameter of the pipe T1, so it is able to restrict a single pipe T1 from passing through the pipe diameter limiting device 23, and when the sensor 232 senses contact with the pipe T1, it will drive the conveying belt 212 to move backward to avoid the collision due to the accumulation of pipes T1. In addition, the distance D for the pipe T1 to slide down to the slope 2121 of the group loading device 24 and independent loading device 25 is short, so it can reduce the rolling range of the pipe T1 and the noise generated by the collision of the pipes T1.

Figure 9:
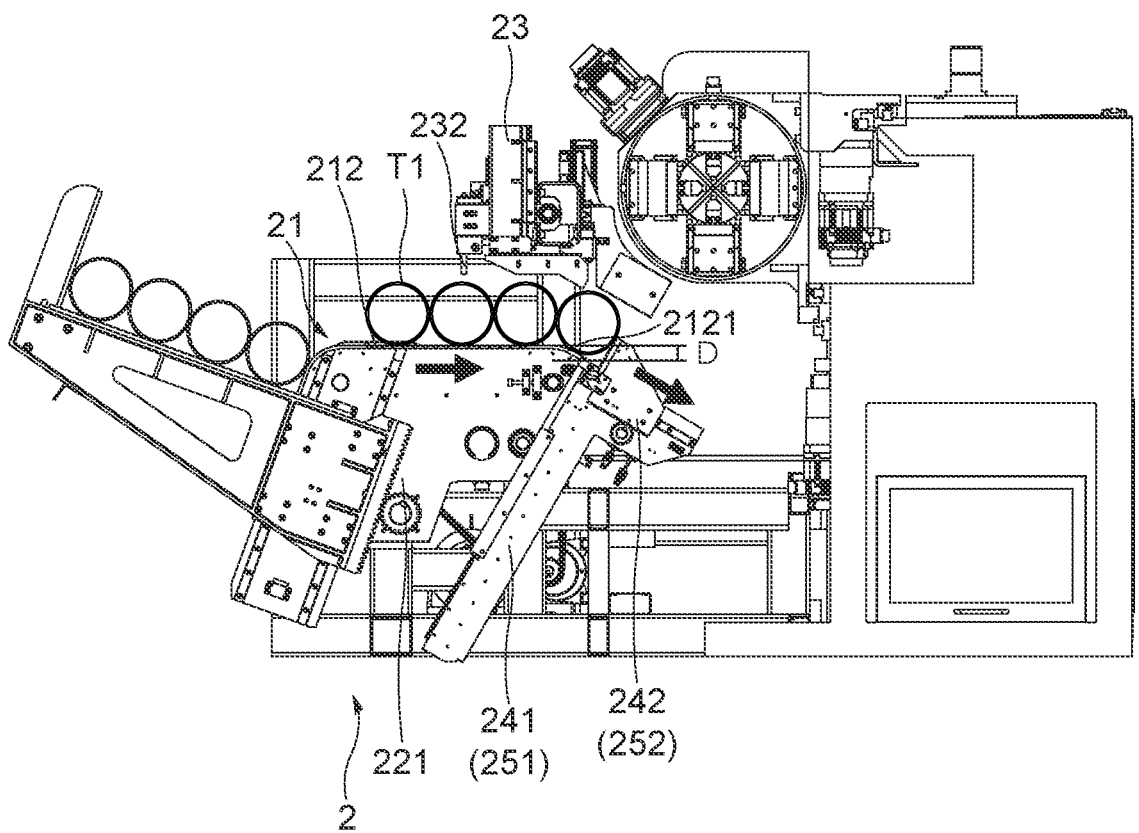
Figure 10:
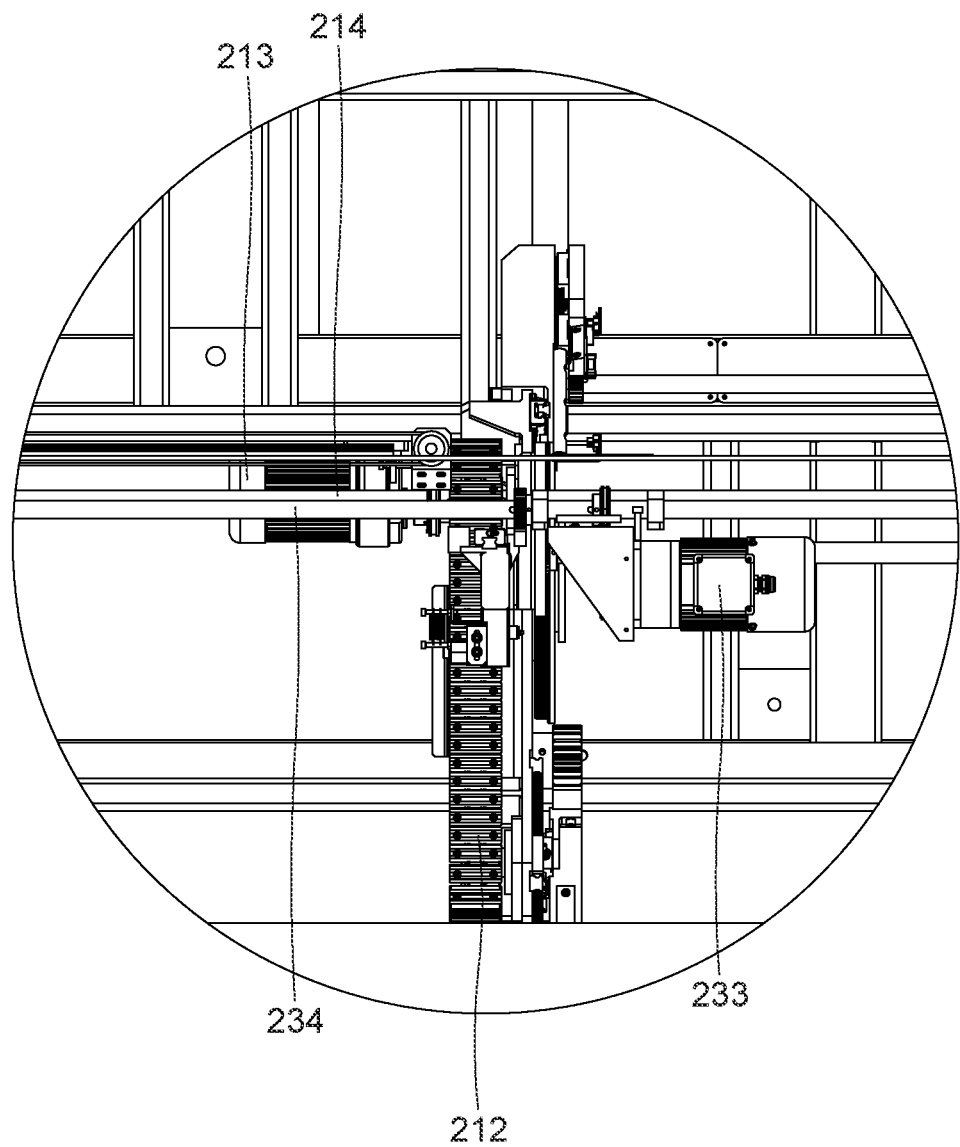
Figure 11:
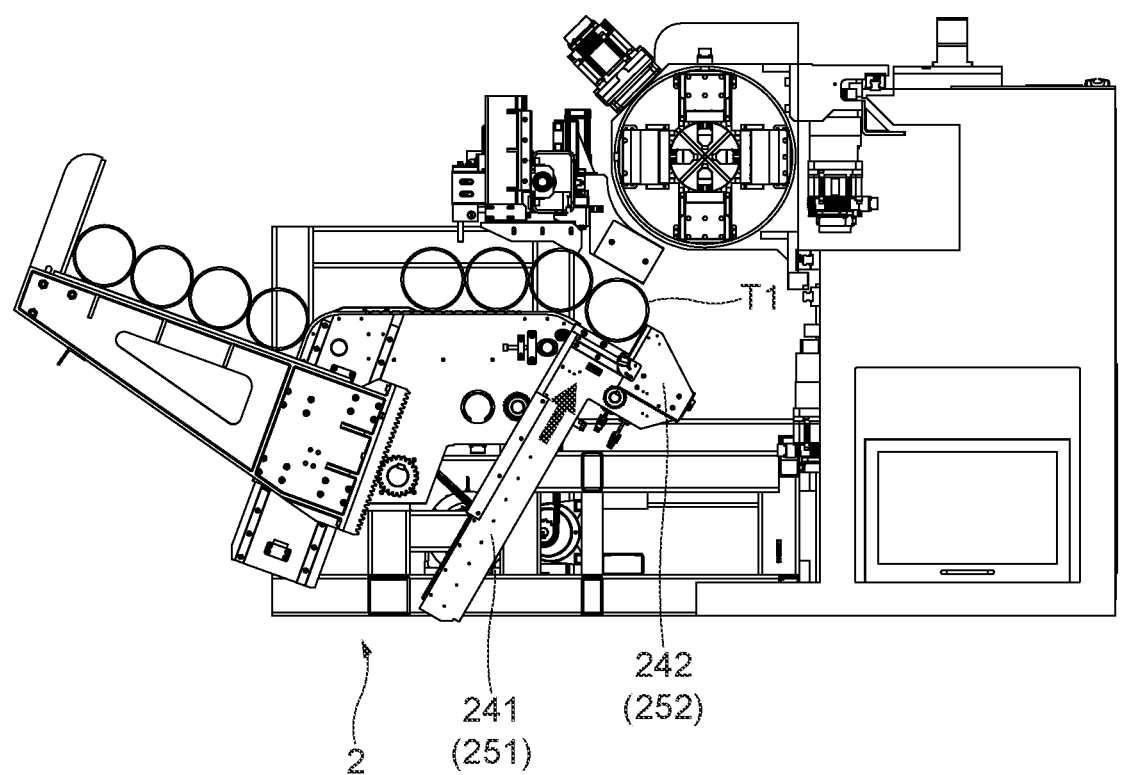
Figure 12:
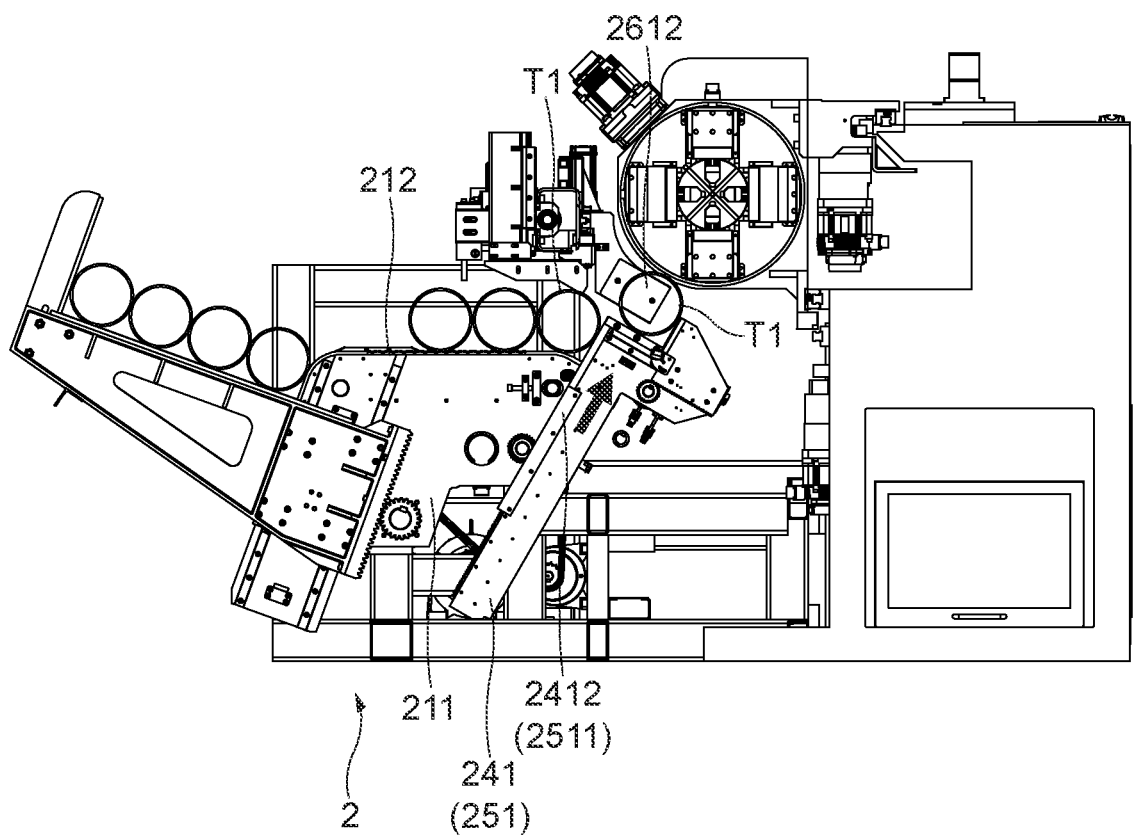
Figure 13:
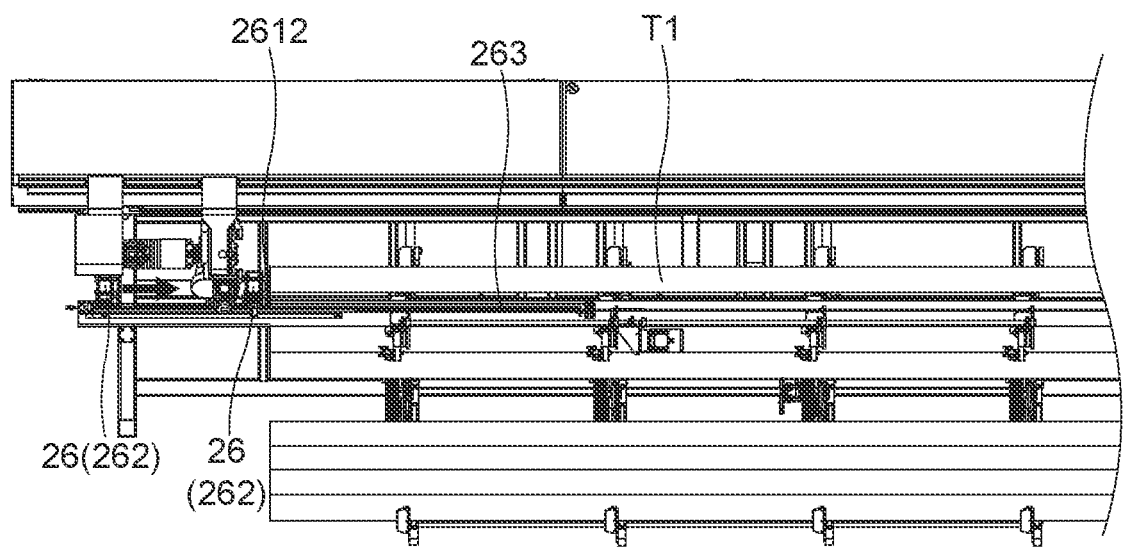

Further, as shown in FIG. 9, when the positioning plate 242 (252) contacts with the pipe T1, the third servo motor 246 and the fifth servo motor 254 will drive the positioning plate 242 (252) to move on the pusher plate 241 (251) synchronously (see FIG. 5) until the pipe T1 is fully positioned on the pusher plate 241 (251) (shown in FIG. 11), then the second servo motor 243 and the fourth servo motor 253 will drive the pusher plate 241 (251) to move on the fixed seat 211 synchronously, to push up the first pipe T1 to the corresponding measuring position. At the same time, the remaining pipes T1 on the conveying belt 212 will be blocked by the pusher plate 241 (251) and the rubber strip 2412 (2511) to move forward continuously (as shown in FIG. 12). At this time, since the displacement mechanism 262 is driven by the pipe measuring device 26 shifting on the slide rail 263 (as shown in FIG. 13) until the moving plate 2621 and fixed plate 201 are placed at the two ends of the pipe T1 respectively, so that the measurement of the length of the pipe T1 is completed.

Figure 14:
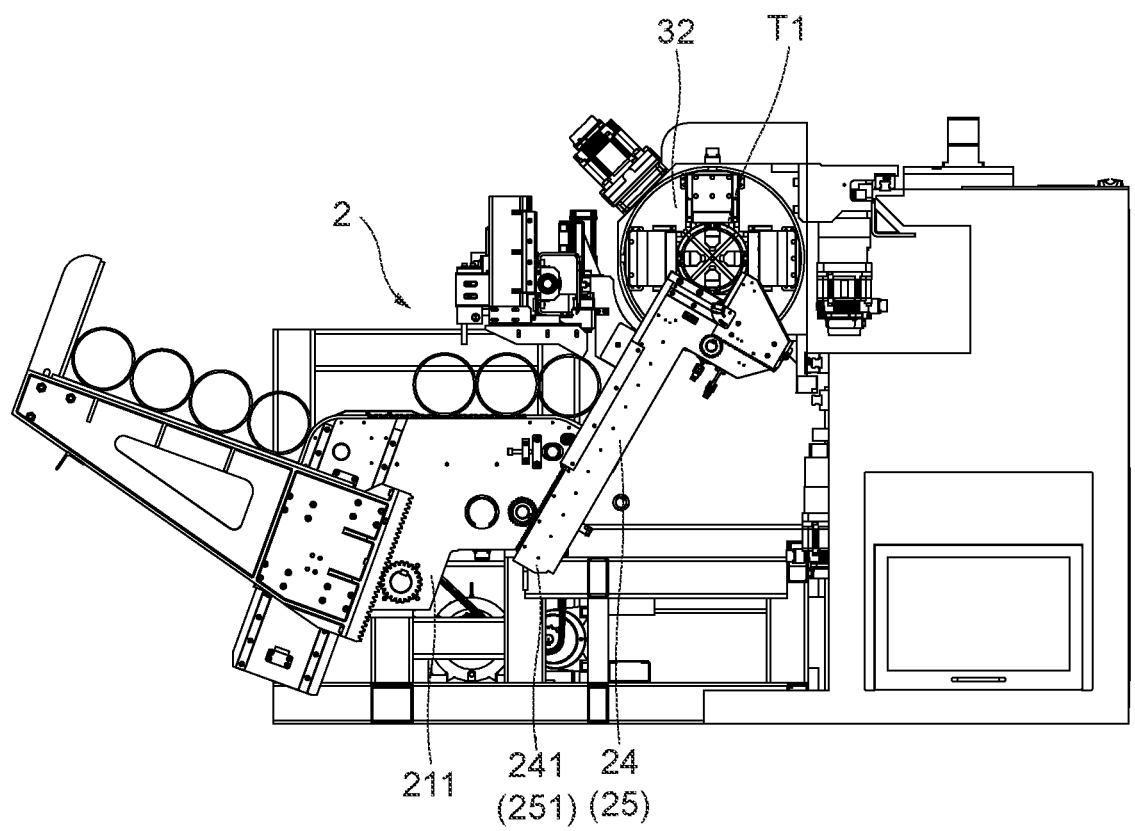
Figure 15:
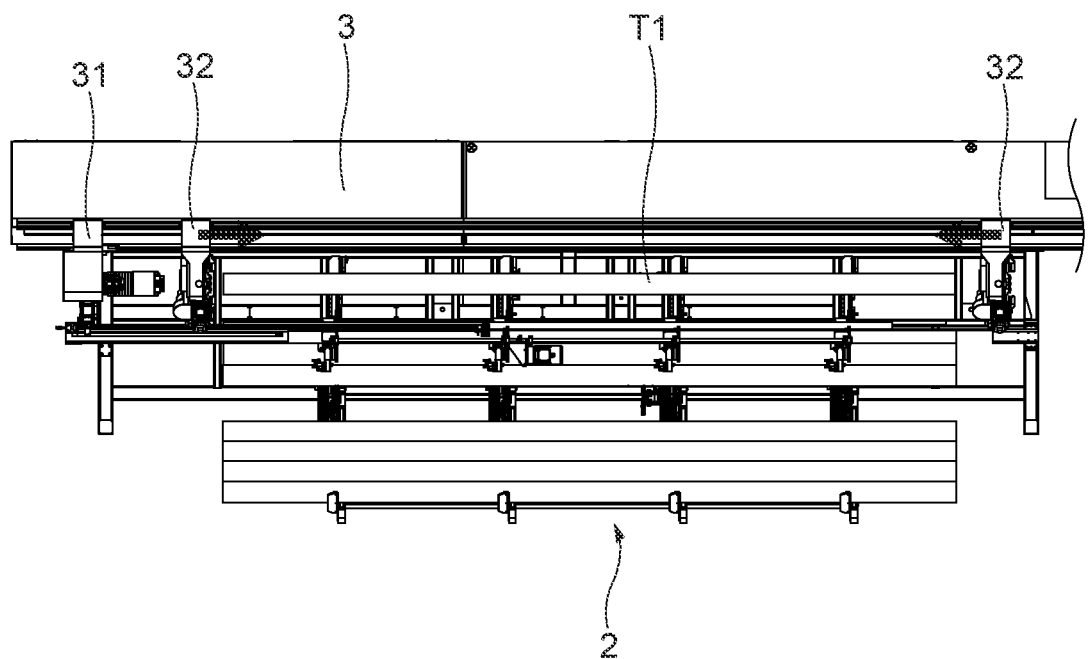
Figure 16:
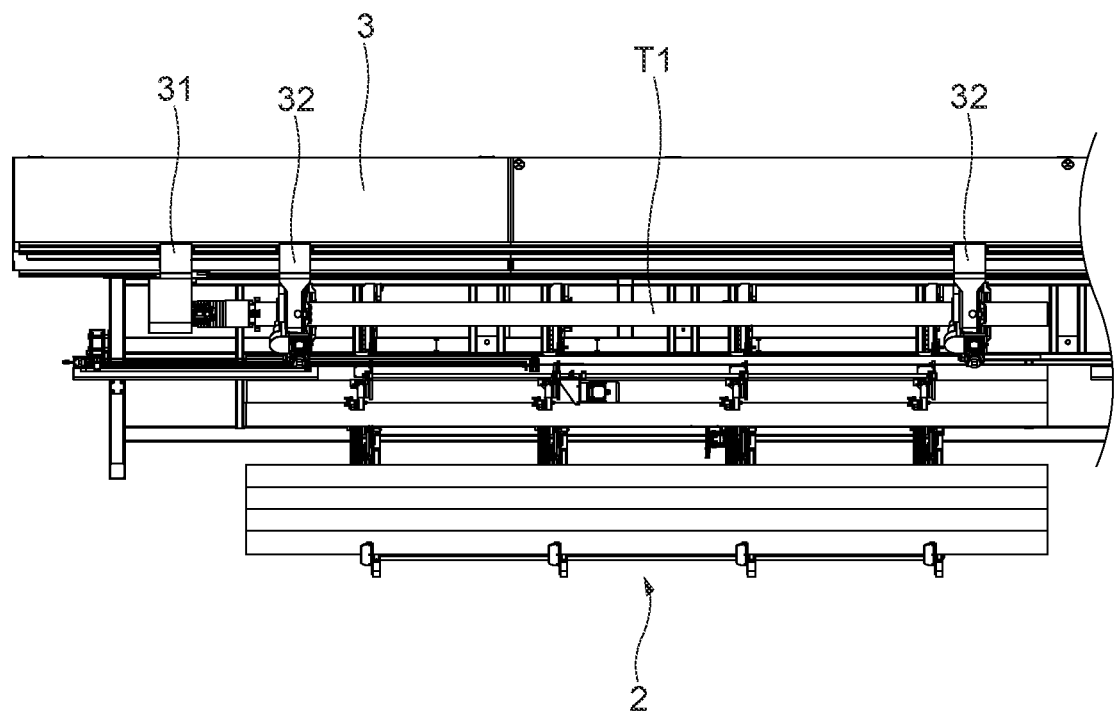
Figure 17:
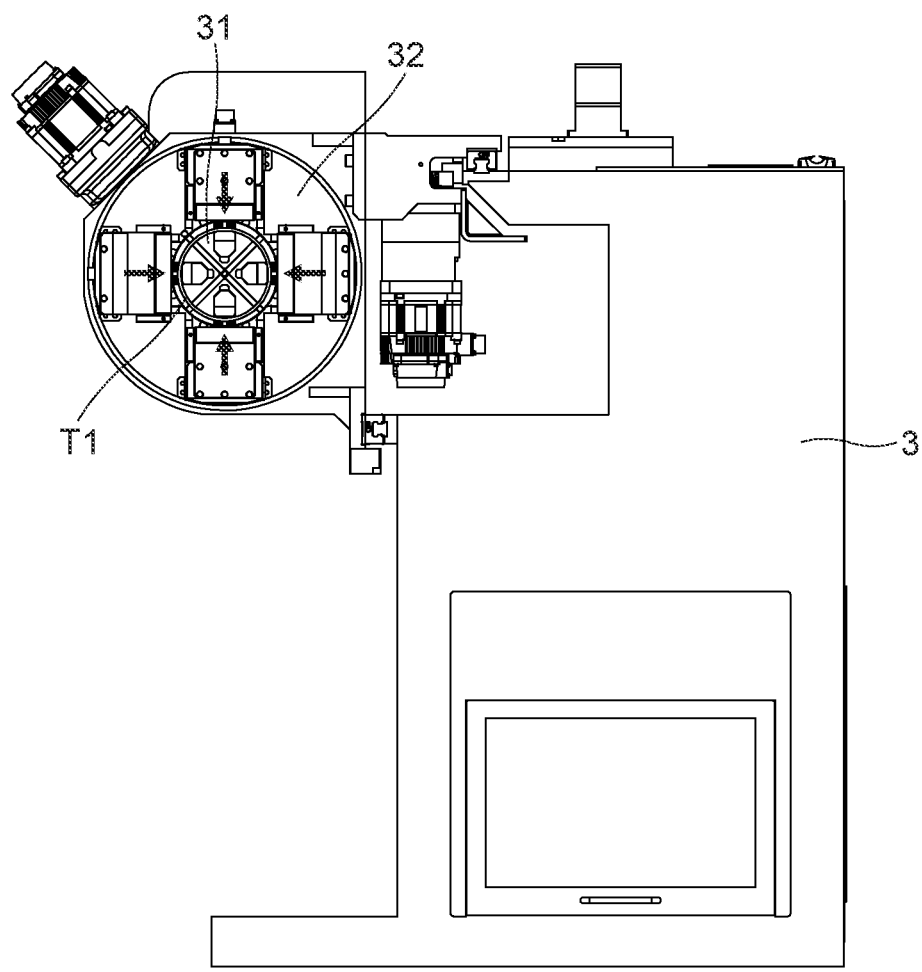

After the length of the pipe T1 is confirmed, and decide to operate the process by the combination of the group loading device 24 and independent loading device 25 based on the length measurement of pipe T1, then having the second servo motor 243 and the fourth servo motor 253 to calculate the required moving distance according to the diameter of pipe T1, then to drive the pusher plate 241 (251) to move on the fixed seat 211 synchronously until the pipe T1 is finally positioned at the center of the chuck assembly 32 (as shown in FIG. 14). At this time, the chuck assembly 32 is driven to move and clamp the pipe T1 by the pipe processing mechanism 3 (as shown in FIG. 15), and it can let multiple sets of the chuck assembly 32 to clamp the pipe T1 according to the length of the pipe T1 (as shown in FIGS. 16 to 17), besides, since the chuck assembly 32 has a larger diameter of opening for the feeding mechanism 31 to pass through, even if the end of the pipe T1 is unable to be supported by the group loading device 24 or independent loading device 25 and hanging down, it still can be inserted into the chuck assembly 32 for clamping with its larger opening, so the feeding mechanism 31 is able to clamp at the end of the pipe T1 steadily and complete the pipe processing operation.

Figure 18:
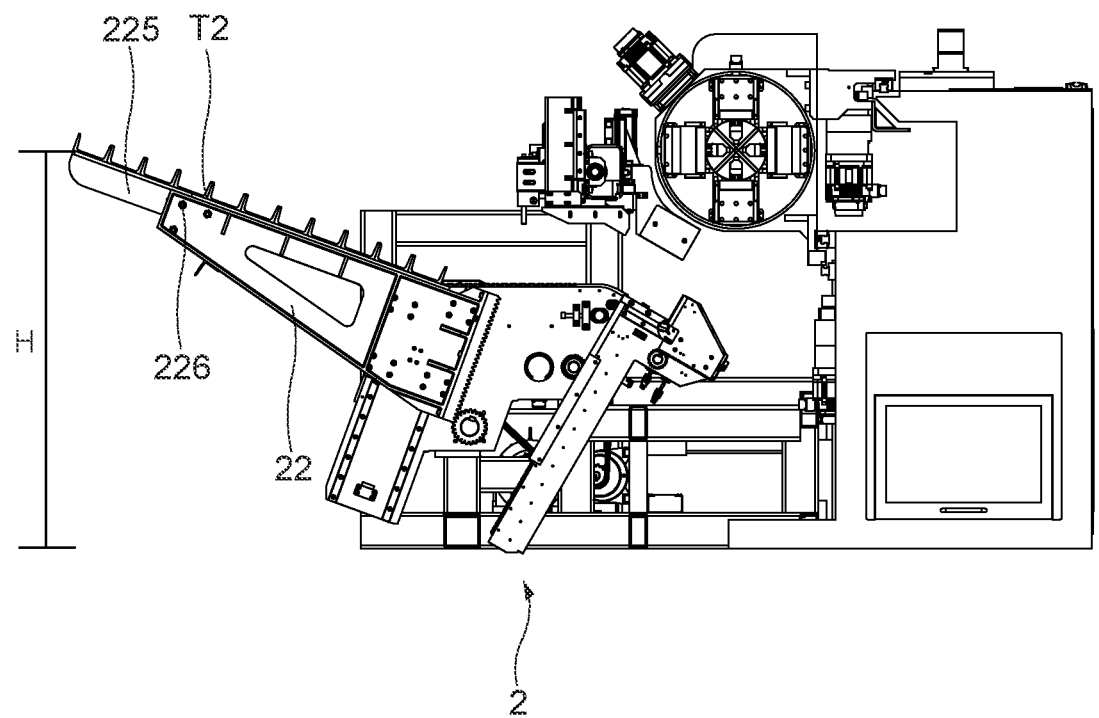
FIG. 18 is a schematic diagram of another embodiment of the present invention.

When the pipe feeding machine 2 is used to convey non-circular pipe T2, please refer to FIG. 18, the lifting plate 22 can be extended the range to accommodate pipe T2 by rotating the baffle plate 225, and even when the lifting plate 22 of the pipe feeding machine 2 is extended the range and up to the highest position H, it is still lower than that of the conventional lifting feeding belt, so it can reduce the space interference from the pipe feeding machine and increases the flexibility of space allocation in the plant.

Therefore, it is obvious that the use of the pipe feeding machine of the present invention can achieve the following effects:
1. the present invention uses the lifting plate to replace the conventional feeding belt to convey the pipes by lifting, so that the pipes can be conveyed steadily in a tidy arrangement, and avoid the collision of the pipes during the lifting process, thus improving the efficiency and yield of the pipe processing;
2. this present invention uses the lifting plate to replace the conventional feeding belt to convey the pipes by lifting, which can reduce the height of the pipe feeding machine, further reduce the space interference from the pipe feeding machine, and increase the flexibility of space allocation in the plant;
3. when the lifting plate of the present invention is used for non-circular pipes, the baffle plate can be rotated to extend the range for accommodating the pipes, even when discharging the pipes manually is required, the number of time for such manual discharging can be reduced and the feeding efficiency of pipes can be increased; and
4. the present invention can reduce the operating burden of the pipe feeding machine by combining the group feeding device with the independent feeding device, so that the feeding process can be determined by synchronizing the operation of the group feeding device and the independent feeding device, or only the group feeding device, according to the length of the pipe.

While the present invention has been described by means of specific embodiments, numerous modifications and variations could be made thereto by those skilled in the art without departing from the scope and spirit of the present invention set forth in the claims.

What is claimed is:

1. A pipe feeding machine for installation at the side of a pipe processing mechanism having a feeding mechanism and at least one chuck assembly, comprising:
a frame;
plural conveying devices, which are assembled on the frame, and a conveying belt for conveying pipes is disposed on a fixed seat, and the plural conveying devices are operated by a first motor to drive a first linkage shaft to drive the conveying belt, a slope is formed at the front end of the conveying belt; plural lifting plates, which are slidably assembled to the fixed seat slantwise, and are used for accommodating the pipes, can be driven by a second motor to drive a second linkage shaft to drive the lifting plate to slide up and down on the fixed seat;
plural pipe diameter limiting devices, which are assembled on the frame, and the pipe diameter limiting device comprising a sensor, a first servo motor, and a third linkage shaft,
a group loading device, comprising at least two loading devices, and each loading device further comprises a pusher plate and a positioning plate, the pusher plate being slidably disposed on the fixed seat slantwise, and can drive a fourth linkage shaft through a second servo motor to drive the pusher plate of the group loading device slides synchronously on the fixed seat; the positioning plate is slidably fixed to the top of the pusher plate and can drive a fifth linkage shaft through a third servo motor to drive the positioning plate sliding synchronously on the pusher plate; and
an independent loading device, comprising a second pusher plate and a second positioning plate, the second pusher plate being slidably disposed on the fixed seat slantwise and can drive the second pusher plate sliding synchronously on the fixed seat through a fourth servo motor; the second positioning plate is slidably fixed to the top of the second pusher plate and can drive the second positioning plate sliding synchronously on the second pusher plate through a fifth servo motor.

2. The pipe feeding machine according to claim 1, wherein the pipe feeding machine further comprises a pipe measuring device which is assembled on the frame, and contains a sixth servo motor, a displacement mechanism with a moving plate, and a slide rail, where the slide rail is set on the frame, and a fixed plate is disposed on the frame opposite to a moving plate, so that the sixth servo motor drives the displacement mechanism on the slide rail until the pipe is moved; the sixth servo motor drives the displacement mechanism to move on the slide rail until the two ends of the pipe are pressed against the fixed plate and the moving plate respectively.

3. The pipe feeding machine according to claim 1, wherein a baffle plate is pivotally disposed on the end edge of the lifting plate at the opposite side of the fixed seat, and the baffle plate can be rotated 90 degrees on the axis of the pivot point to extend the length of the lifting plate.

4. The pipe feeding machine according to claim 1, wherein the sensor of the pipe diameter limiting device can transmit a signal to the conveying device to drive the conveying belt backward when it senses a collision with the pipe.

5. The pipe feeding machine according to claim 1, wherein the pusher plate is provided with a rubber strip which is made of anti-collision material on the end side of the pusher plate that contacts the pipe.

6. The pipe feeding machine according to claim 1, wherein the pipe feeding machine can be set to operate synchronously by the group loading device and the independent loading device, or by the group loading device alone, depending on the length of the pipe.

7. The pipe feeding machine according to claim 1, wherein the pusher plate of the group loading device and the independent loading device convey the pipes to the center of the corresponding chuck assembly by calculating the required displacement distance according to the diameter of the pipe.

8. The pipe feeding machine according to claim 1, wherein the chuck assembly includes a large diameter opening for the feeding mechanism to pass through.

\* \* \* \* \*